United States Patent
Labrozzi et al.

(10) Patent No.: US 12,126,879 B2
(45) Date of Patent: Oct. 22, 2024

(54) SURGICAL MICRO-ENCODING OF CONTENT

(71) Applicant: Disney Enterprises, Inc., Burbank, CA (US)

(72) Inventors: Scott Labrozzi, Cary, NC (US); William B. May, Jr., Sunnyvale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/861,063

(22) Filed: Jul. 8, 2022

(65) Prior Publication Data

US 2024/0015369 A1 Jan. 11, 2024

(51) Int. Cl.
*H04N 21/845* (2011.01)
*H04N 21/2383* (2011.01)

(52) U.S. Cl.
CPC ..... *H04N 21/8455* (2013.01); *H04N 21/2383* (2013.01)

(58) Field of Classification Search
None
See application file for complete search history.

(56) References Cited

U.S. PATENT DOCUMENTS

| 10,841,666 | B1 | 11/2020 | Effinger et al. | |
|---|---|---|---|---|
| 2004/0123109 | A1* | 6/2004 | Choi | H04N 21/8126 713/176 |
| 2008/0189733 | A1* | 8/2008 | Apostolopoulos | H04N 21/4756 725/28 |

(Continued)

FOREIGN PATENT DOCUMENTS

| CN | 101621636 | 4/2011 |
|---|---|---|
| WO | 2008/056358 | 5/2008 |

(Continued)

OTHER PUBLICATIONS

Extended European Search Report for EP Application 23179996.6 dated Nov. 15, 2023.
"Digital Program Insertion Cueing Message" Jan. 1, 2022 https://wagtail-prod-storage.s3.amazonaws.com/documents/SCTE_35_2022b.pdf 101 Pgs.

(Continued)

*Primary Examiner* — Jason K Lin
(74) *Attorney, Agent, or Firm* — Farjami & Farjami LLP

(57) ABSTRACT

A system includes a computing platform having processing hardware, and a memory storing software code. The software code is executed to receive content having a sequence of content segments, and marker data identifying a location within the sequence, identify, using the content and the marker data, segment boundaries of a content segment containing the location, determine, using the location and the segment boundaries, whether the location is situated within a predetermined interval of one of the segment boundaries, and re-encode a subsection of the sequence to produce a new segment boundary at the location. When the location is not situated within the predetermined interval, the subsection of the sequence includes the content segment containing the location. When the location is situated within the predetermined interval, the subsection of the sequence includes the content segment containing the location and a content segment adjoining the content segment containing the location.

20 Claims, 7 Drawing Sheets

(56) References Cited

U.S. PATENT DOCUMENTS

| | | | | |
|---|---|---|---|---|
| 2013/0282915 A1* | 10/2013 | Patel | ................ | H04L 65/60 |
| | | | | 709/231 |
| 2014/0025835 A1* | 1/2014 | Gahm | ................ | H04N 21/2401 |
| | | | | 709/231 |
| 2015/0281752 A1* | 10/2015 | Van Veldhuisen | ... | H04N 21/233 |
| | | | | 725/116 |
| 2018/0332320 A1* | 11/2018 | Barkley | ................ | H04N 21/812 |
| 2021/0120061 A1* | 4/2021 | Labrozzi | .......... | H04N 21/23439 |

FOREIGN PATENT DOCUMENTS

| | | |
|---|---|---|
| WO | 2008/057444 | 5/2008 |
| WO | 2016/071401 | 5/2016 |
| WO | 2020/006250 | 1/2020 |

OTHER PUBLICATIONS

Eduardo Saiz, Karen Troiano, Torbjorn Einarsson, Pablo Curiel "VOD2Live: Exploring the technical challenges in the adaptive generation of linear FAST channels from existing on-demand and live content and personalized ad selection" 2022 IEEE International Symposium on Broadband Multimedia Systems and Broadcasting (BMSB), Jun. 15, 2022 6 Pgs.

"Series J: Cable Networks and Transmission of Television, Sound Programme and other Multimedia Signals" ITU-T Standard, International Telecommunication Union, Geneva, CH. Sep. 12, 2014 70 Pgs.

* cited by examiner

SURGICAL MICRO-ENCODING OF CONTENT

BACKGROUND

Due to its nearly universal popularity as a content medium, ever more audio-video (AV) content is being produced and made available to consumers. Moreover, as streaming platforms have become increasingly important distribution hubs for AV content, adjustable bit-rate (ABR) AV content has become increasingly important as well, due to variable network conditions and differences in data processing capabilities among the wide variety of consumer devices that receive streaming content. As a result, the efficiency with which AV content, including ABR content, can be supplemented or enhanced post production has become increasingly important to the producers, owners, and distributors of that content.

By way of example, in some use cases it may be advantageous or desirable to supplement AV content, post production, through the addition of interstitial content, such as advertisements (ads) for instance. In cases in which the AV content was originally produced without predetermined insertion points for interstitial content, introducing that content post production can result in an unpleasant or confusing experience for a consumer viewing the content during playback. For example, an ad that has been naively inserted into AV content may appear mid-scene, or even mid-shot, thereby jarringly disrupting the viewing experience of the consumer. A conventional approach to adding interstitial content that avoids viewer disruption and aesthetic unpleasantness is to re-encode the content in its entirety, this time taking into account splice points for use in conditioning segment boundaries for ads or other interstitial content. However, this conventional approach is undesirably, and in some instances impracticably, expensive in terms both of compute time and the quality control (QC) review required for the re-encoded content.

DETAILED DESCRIPTION

Figure 1:
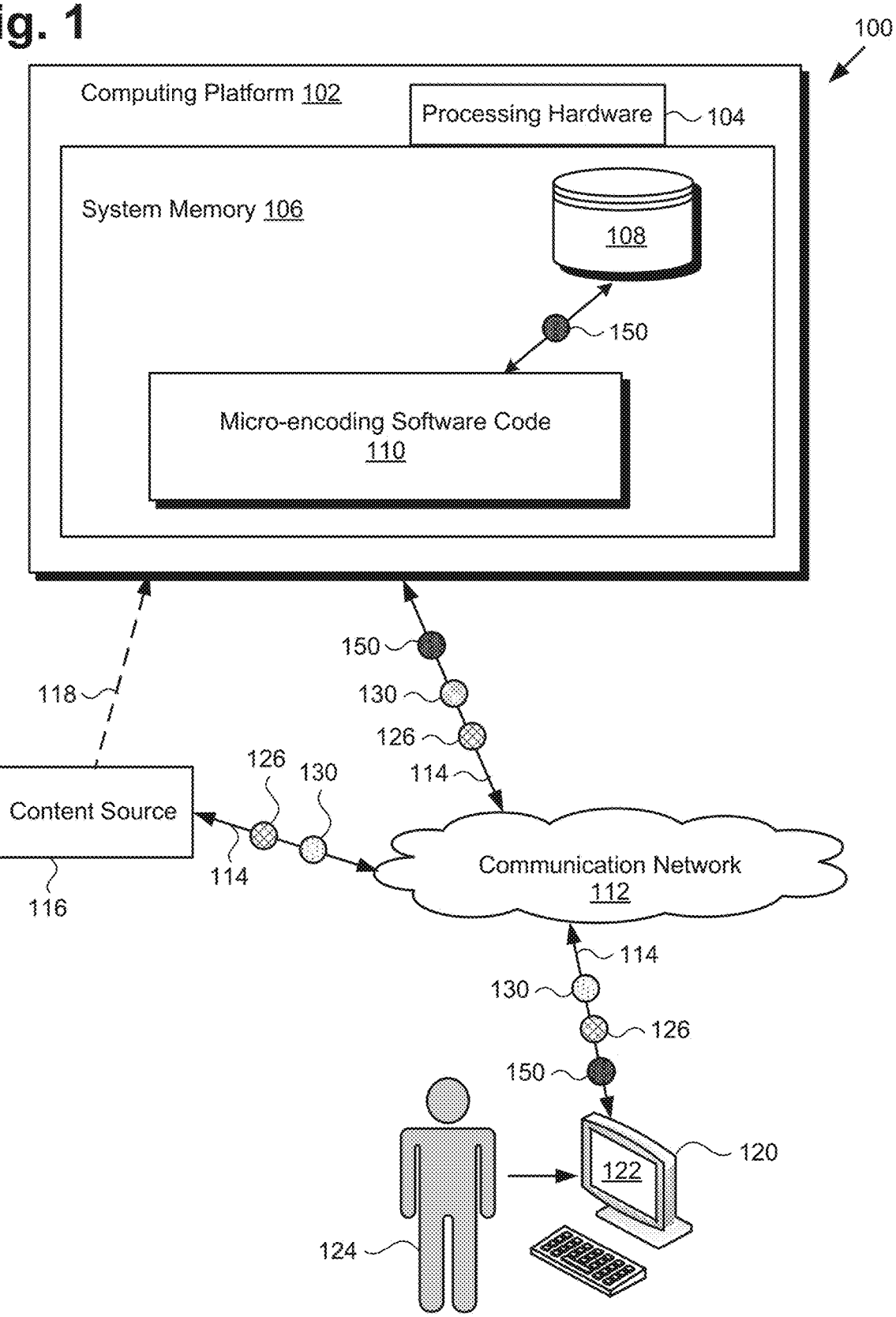
FIG. 1 shows a diagram of an exemplary system for surgically micro-encoding content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, in cases in which the audio-video (AV) content is originally produced without predetermined insertion points for interstitial content, introducing that content post production can result in an unpleasant or confusing experience for a consumer viewing the content during playback. For example, interstitial content in the form of an advertisement (hereinafter "ad") that has been naively inserted into AV content may appear mid-scene, or even mid-shot, thereby jarringly disrupting the viewing experience of the consumer. A conventional approach to adding interstitial content that avoids viewer disruption and aesthetic unpleasantness is to re-encode the content in its entirety, this time taking into account splice points for use in conditioning segment boundaries for ads or other interstitial content. However and as also noted above, this conventional approach is undesirably, and in some instances impracticably, expensive in terms both of compute time and the quality control (QC) review required for the re-encoded content.

The present application discloses systems and methods for surgically micro-encoding content. It is noted that, as defined in the present application, the expression "micro-encoding" refers to the selective re-encoding of one or more sections of content that has previously been transcoded, but less than all of the content, in order to enable the introduction of new interstitial content, such as ads for example, without negatively impacting the aesthetic integrity of creative intent of the original content. The surgical micro-encoding solution disclosed in the present application enables creation of new segment boundaries where ones did not previously exist by advantageously considering new content segment boundary locations, existing content segment boundaries, restrictions on minimum and maximum content segment durations, the potential for subjective audio or video irregularities produced by re-encoding, and preservation of original metadata, as well as modification needs to alternate content playlists. In addition, the present solution advances the state-of-the-art as described above while significantly reducing the time required to re-encode, as well as the QC tune required in validation, because only surgically targeted micro-areas are re-encoded. Moreover, the present surgical micro-encoding solution may be implemented using automated or substantially automated systems and methods.

As defined in the present application, the terms "automation," "automated," and "automating" refer to systems and processes that do not require the participation of a human user, such as a system administrator. For example, although in some implementations a human editor or QC technician may review the performance of the systems and methods disclosed herein, that human involvement is optional. Thus, in some implementations, the processes described in the present application may be performed under the control of hardware processing components of the disclosed systems.

It is also noted that, as defined in the present application, "content" may refer to a variety of different types and genres of AV content, as well as to video unaccompanied by audio, or audio unaccompanied by video. Specific examples of AV content include adjustable bit-rate (ABR) content in the form of movies, TV episodes or series, video games, and sporting events. In addition, or alternatively, in some implementations, "content" may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the concepts disclosed by the present application may also be applied to content that is a hybrid of traditional AV and fully immersive VR/AR/MR experiences, such as interactive video.

FIG. 1 shows a diagram of exemplary system 100 for surgically micro-encoding content, according to one implementation. System 100 includes computing platform 102 having processing hardware 104, and system memory 106 implemented as a computer-readable non-transitory storage medium. As shown in FIG. 1, according to some implementations, system memory 106 stores micro-encoding software code 110, and may optionally store content database 108.

As further shown in FIG. 1, system 100 may be implemented in a use environment including content source 116 providing transcoded content 130 (hereinafter "content 130") and marker data 126 for content 130, communication network 112, and user 124 utilizing user system 120 including display 122. In addition, FIG. 1 shows network communication links 114 communicatively coupling content source 116 and user system 120 with system 100 via communication network 112. Also shown in FIG. 1 is re-encoded content 150 corresponding to content 130 and provided by micro-encoding software code 110.

It is noted that although system 100 may receive content 130 from content source 116 via communication network 112 and network communication links 114, in some implementations, content source 116 may take the form of a content source integrated with computing platform 02, or may be in direct communication with system 100, as shown by dashed communication link 118.

With respect to the representation of system 100 shown in FIG. 1, it is noted that although micro-encoding software code 110 and optional content database 108 are depicted as being stored in system memory 106 for conceptual clarity, more generally system memory 106 may take the form of any computer-readable non-transitory storage medium. The expression "computer-readable non-transitory storage medium," as used in the present application, refers to any medium, excluding a carrier wave or other transitory signal that provides instructions to processing hardware of a computing platform, such as processing hardware 104 of computing platform 102. Thus, a computer-readable non-transitory storage medium play correspond to various types of media, such as volatile media and non-volatile media, for example. Volatile media may include dynamic memory, such as dynamic random access memory (dynamic RAM), while in-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts micro-encoding software cod 110 and optional content database 108 as being mutually co-located in system memory 106, that representation is also merely provided as an aid to conceptual clarity. More generally, system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within system 100. Thus, it is to be understood that micro-encoding software code 110 and optional content database 108 may be stored remotely from one another within the distributed memory resources of system 100.

Processing hardware 104 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platforms 102, as well as a Control Unit (CU) for retrieving programs, such as micro-encoding software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

Moreover, as defined in the present application, the expression "machine learning model" or "ML model" may refer to a mathematical model for making future predictions based on patterns learned from samples of data or "training data." Various learning algorithms can be used to map correlations between input data and output data. These correlations form the mathematical del that can be used to make future predictions on new input data. Such a predictive model may include one or more logistic regression models, Bayesian models, or neural networks (NNs). Moreover, a "deep neural network," in the context of deep learning, may refer to a NN that utilizes multiple hidden layers between input and output layers, which may allow for learning based on features not explicitly defined in raw data. In various implementations, NNs may be trained as classifiers and may be utilized to perform image processing or natural-language processing.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, system 100 may be implemented virtually, such as in a data center. For example, in some implementations, system 100 may be implemented in software, or as virtual machines.

Although user system 120 is shown as a desktop computer in FIG. 1, that representation is provided merely as an example as well. More generally, user system 120 may be any suitable mobile or stationary computing device or system that implements data processing capabilities sufficient to provide a user interface, support connections to communication network 112, and implement the functionality ascribed to user system 120 herein. For example, in other implementations, user system 120 and may take the form of a laptop computer, tablet computer, or smartphone.

With respect to display 122 of user system 120, display 122 may be physically integrated with user system 120, or may be communicatively coupled to but physically separate from respective user system 120. For example, where user system 120 is implemented as a smartphone, laptop computer, or tablet computer, display 122 will typically be integrated with user system 120. By contrast, where user system 120 is implemented as a desktop computer, display 122 may take the fore of a monitor separate from user system 120 in the form of a computer tower. Furthermore, display 122 of user system 120 may be implemented as a liquid crystal display (LCD), a light-emitting diode (LED) display, an organic light-emitting diode (OLED) display, a quantum dot (QD) display, or any other suitable display screen that performs a physical transformation of signals to light.

Figure 2A:
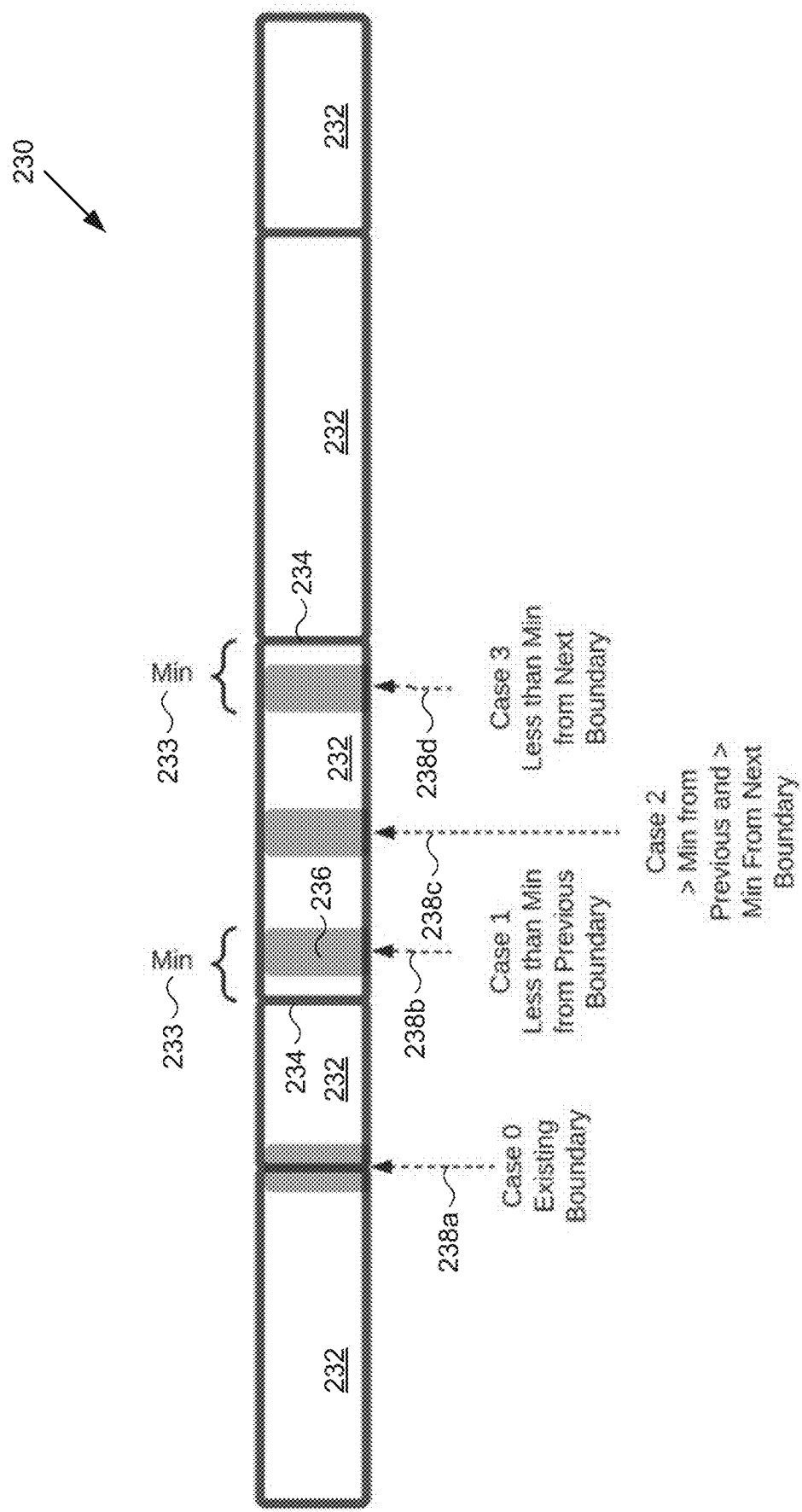
FIG. 2A shows an exemplary diagram depicting four alternative regions of a content segment that an insertion point for interstitial content may occupy, according to one implementation.

FIG. 2A shows an exemplary diagram depicting four alternative regions of a content segment that an insertion point for interstitial content may occupy, according to one implementation. As shown in FIG. 2A, content 230 includes a sequence of content segments 232, each defined by segment boundaries 234. Also shown in FIG. 2A are markers 238a, 238b, 238c, and 238d identifying respective desired locations for insertion of interstitial content, and minimum content segment duration 233. In addition, FIG. 2A shows multiple shaded boxes, represented by exemplary shaded box 236, each of which simply represents a slug, i.e., one or more transition frames where video/audio transitions to black/silence for a few seconds, as known in the art. Slugs are often used to delineate a place for an ad-break or other interstitial content. Slugs allow for a pleasant subjective viewer experience when transitioning from content to an ad, for example, and back again. As shown in FIG. 2A, it may be desirable for each of markers 238a, 238b, 238c, and 238d to be located at the mid-point of a respective slug. It is noted that although the present application refers to the presence of black slugs, it is the positions of markers 238a, 238b, 238c, and 238d that is being addressed.

Content 230 corresponds in general to content 130, in FIG. 1. Thus, content 130 may share any of the characteristics attributed to content 230 by the present disclosure, and vice versa. That is to say, like content 230, content 130 may include a sequence of content segments 232 characterized by minimum content segment duration 233.

With respect to minimum content segment duration 233, it is noted that for a variety of reasons there may be limitations imposed on the minimum and maximum content segment duration. In a practical sense, for example, it is undesirable to have a content segment that includes only a single frame. As a result, it may be the case that a streaming service has or imposes minimum content segment duration 233 on the content they deliver. Furthermore, for some ABR protocols, maximum content segment duration 233 may be predetermined, and that value may be included in the description of the content. For example, in Hypertext Transfer Protocol (HTTP) Live Streaming (HLS), the content playlist tag EXT-X-TARGETDURATION is required and specifies maximum content segment duration 233.

Thus, the position of a marker in relation to an existing segment boundary 234 can be described as being in one of four relative positions identified in FIG. 2A as Case 0, Case 1, Case 2, and Case 3. In Case 0, marker 238a already aligns perfectly with an existing segment boundary. As a result, for Case 0 no further processing or re-encoding is necessary because segment boundary 234 enabling insertion of interstitial content at the location of marker 238a already exists.

In Case 1, by contrast, the location of marker 238b is within minimum content segment duration 233 from segment boundary 234 at the beginning of a content segment. Consequently, simply creating a new segment boundary at the location of marker 238b would violate minimum content segment duration 233. Analogously, the location of marker 238d is within minimum content segment duration 233 from segment boundary 234 at the end of a content segment. Consequently, simply creating a new segment boundary at the location of marker 238d would also violate minimum content segment duration 233.

In Case 2, by contrast to Case 0, Case 1, and Case 3, the location of marker 238c is not located within minimum content segment duration 233 from a segment boundary 234 at the beginning or at the end of a content segment. As a result, creation of a new segment boundary at the location of marker 238c would not violate minimum content segment duration 233.

Figure 2B:
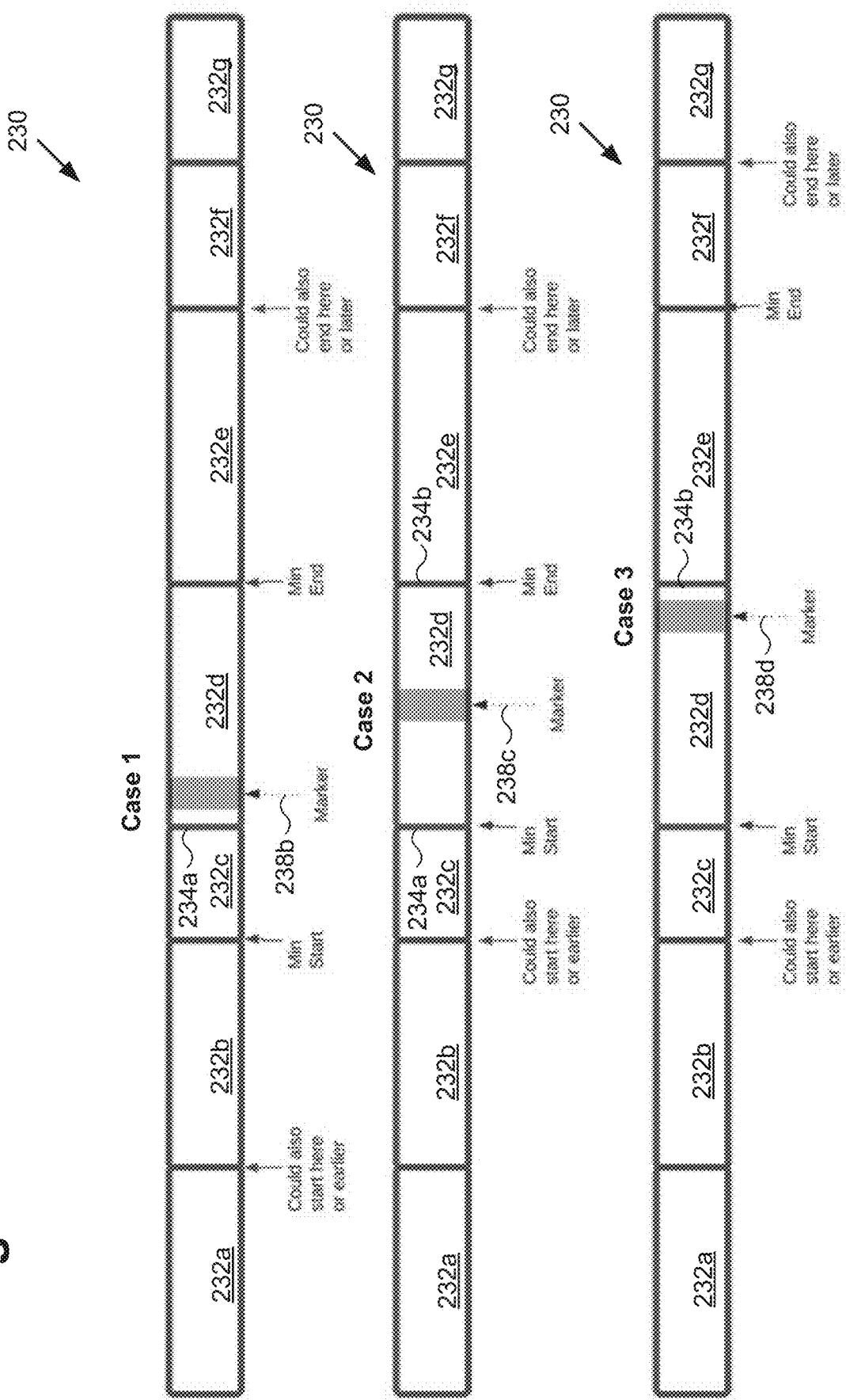
FIG. 2B shows an exemplary diagram depicting respective strategies for surgically micro-encoding content for each of three of the alternatives depicted in FIG. 2A, according to one implementation.

FIG. 2B shows an exemplary diagram depicting respective strategies for surgically micro-encoding content for each of three of the alternatives depicted in FIG. 2A, i.e., Case 1, Case 2, and Case 3, according to one implementation. It is noted that any features identified in FIG. 2B by reference numbers identical to those used to identify features in FIG. 2A correspond respectively to those features and may share any of the characteristics attributed to those corresponding features, above.

As shown in FIG. 2B, content 230 includes a sequence of content segments 232a, 232b, 232c, 232d, 232e, 232f, and 232g (hereinafter "content segments 232a-232g"), and segment boundaries represented by exemplary segment boundaries 234a and 234b. Also shown in FIG. 2B are markers 238b, 238c, and 238d, as well as their respective slugs.

For Case 1, re-encoding cannot start at the beginning of content segment 232d containing marker 238b because if re-encoding were to start at the beginning of content segment 232d and a new segment boundary were to be produced at marker 238b, the minimum content segment duration requirement discussed above by reference to FIG. 2A would be violated. Thus, re-encoding must start no later than the start time of the preceding content segment start, i.e., the start time of preceding and adjoining content segment 232c. For Case 1, re-encoding can finish at the end of content segment 232d containing marker 238b.

It is noted that although the minimum subsection of content 230 that must be re-encoded to produce a new segment boundary at the location of marker 238b finishes at the end of content segment 232d containing the location of marker 238b and starts at the beginning of content segment 232c preceding and adjoining content segment 232d, other re-encoding durations are possible. For example re-encoding for Case 1 may begin prior to content segment 232c, such as at the beginning of content segment 232b for example, or at the beginning of any content segment preceding content segment 232b. In addition, or alternatively, re-encoding for Case 1 may finish at the end of a later content segment, such as the end of content segment 232e for example, or the end of a subsequent content segment.

For Case 2, re-encoding can start at the beginning of content segment 232d containing marker 238b and can finish at the end of content segment 232d because marker 238c is not located within the minimum content segment duration of either segment boundary 234a or 234b of content segment 232d. It is noted that although the minimum subsection of content 230 that must be re-encoded to produce a new segment boundary at the location of marker 238c starts and ends at the content boundaries of content segment 232d containing the location of marker 238c, other re-encoding durations are possible. For example re-encoding for Case 2 may begin prior to content segment 232d, such as at the beginning of content segment 232c for example, or at the beginning of any content segment preceding content segment 232c. In addition, or alternatively, re-encoding for Case 2 may finish at the end of a later content segment, such as the end of content segment 232e for example, or the end of a subsequent content segment.

For Case 3, re-encoding can start at the beginning of content segment 232d containing marker 238b but cannot finish at the end of content segment 232d because if re-encoding were to finish at the end of content segment 232d and a new segment boundary were to be produced at marker 238d, the minimum content, segment duration requirement discussed above by reference to FIG. 2A would be violated. Thus, re-encoding must finish no earlier than the end time of the succeeding content segment end, i.e., the end time of succeeding and adjoining content segment 232e. For Case 3, re-encoding can start at the beginning of content segment 232d containing marker 238d, as noted above.

Although the minimum subsection of content 230 that must be re-encoded to produce a new segment boundary at the location of marker 238d starts at the beginning of content segment 232d containing the location of marker 238d and finishes at the end of content segment 232e succeeding and adjoining content segment 232d, other re-encoding durations are possible. For example re-encoding for Case 3 may begin prior to content segment 232d, such as at the beginning of content segment 232c for example, or at the beginning of any content segment preceding content segment 232c. In addition, or alternatively, re-encoding for Case 3 may finish at the end of a later content segment, such as the end of content segment 232f for example, or the end of a subsequent content segment.

Figure 2C:
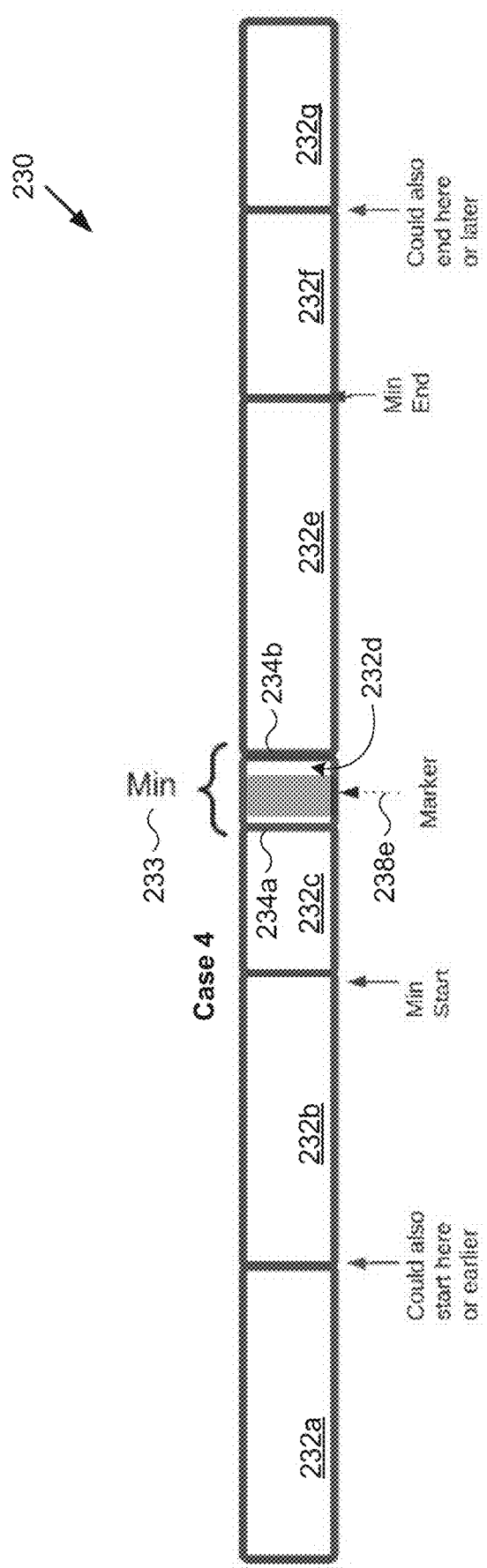
FIG. 2C shows an exemplary diagram depicting a strategy for surgically micro-encoding content for an alternative use case, according to one implementation.

FIG. 2C shows an exemplary diagram depicting a strategy for surgically micro-encoding content for an alternative use case, i.e., Case 4, according to one implementation. It is noted that any feature in FIG. 2C identified by a reference number identical to a reference number appearing in FIG. 2B corresponds to that feature and may share any of the characteristics attributed to that corresponding feature by the present disclosure. As shown in FIG. 2C, in Case 4 marker 238e is located within minimum content segment duration 233 of each of segment boundaries 234a and 234b of content segment 232d.

Analogously to Case 1 described above, for Case 4, re-encoding cannot start at the beginning of content segment 232d containing marker 238e because if re-encoding were to start at the beginning of content segment 232d and a new segment boundary were to be produced at marker 238b, the minimum content segment duration requirement discussed above by reference to FIG. 2A would be violated. Thus, re-encoding must start no later than the start time of the preceding content segment start, i.e., the start time of preceding and adjoining content segment 232c. However, analogously to Case 3, for Case 4, re-encoding cannot finish at the end of content segment 232d because if re-encoding were to finish at the end of content segment 232d and a new segment boundary were to be produced at marker 238e, the minimum content segment duration requirement discussed above by reference to FIG. 2A would also be violated. Thus, re-encoding must finish no earlier than the end time of the succeeding content segment end, i.e., the end time of succeeding and adjoining content segment 232e. Thus, For Case 4, re-encoding can start at the beginning of content segment 232c and may finish at the end of content segment 232e.

Although the minimum subsection of content 230 that must be re-encoded to produce a new segment boundary at the location of marker 238e starts at the beginning of content segment 232c preceding and adjoining content segment 232d containing the location of marker 238e and finishes at the end of content segment 232e succeeding and adjoining content segment 232d, other re-encoding durations are possible. For example re-encoding for Case 4 may begin prior to content segment 232c, such as at the beginning of content segment 232b for example, or at the beginning of any content segment preceding content segment 232b. In addition, car alternatively, re-encoding for Case 4 may finish at the end of a later content segment, such as the end of content segment 232f for example, or the end of a subsequent content segment.

It is noted that the re-encoding strategies for each of Case 1, Case 2, Case 3, and Case 4 identifies a minimum subsection of content 230 to be re-encoded that is characterized by a data triplet including a start time for the minimum subsection, an end time for the minimum subsection, and a marker location. It is further noted that although the re-encoding strategies applied to Case 1, Case 3, and Case 4 produce a new segment boundary at the respective locations of markers 232b, 232d, and 232e by effectively shifting one or more existing segment boundaries to a new location without adding more content segments to content 230, the strategy applied to Case 2 partitions single content segment 232d into two content segments.

Thus, where any subsection of content 230 that undergoes re-encoding according to the present novel and inventive surgical micro-encoding techniques initially includes an integer number "N" of content segments, after re-encoding, that re-encoded subsection may include N content segments or N+1 content segments. Moreover, because for Case 2 the only requirement imposed, on re-encoding is that the start and end of content segment 232d, and the location of marker 238c are honored, in some implementations the subsection of content 230 that undergoes re-encoding and initially includes N content segments may be re-encoded into N content segments, N+1 content, segments, or more than N+1 content segments. In other words, the original subsection of content 230 may include at least one fewer content segment than that subsection after it is re-encoded.

The start and end times for the minimum re-encoding subsections of content 230 described above do not consider characteristics of the underlying content that may result in one or both of those start and end times for re-encoding being less than optimal. For example, content at the start location of the minimum re-encoding subsection, its end, or both may have certain attributes that if re-encoding were to start or end there, may result in an audio artifact, a video artifact, or both an audio artifact and a video artifact noticeable upon playback of content 230. The process for identifying an optimal re-encoding subsequence of content 230 that includes the minimum re-encoding subsequences described above by reference to Case 1, Case 2, Case 3, and Case 4 may include a variety of methods to reduce or eliminate such issues. For example, the process of determining an optimal start time and end time for re-encoding may consider one or more of content metadata, such as Dolby Vision® shot metadata, scene change detection, chunk boundary complexity analysis, and the like. The end result is analogous, a data triplet identifying a start time for the re-encoding subsection, an end time for the re-encoding subsection, and a location of a marker contained within the re-encoding subsection. Determination of an optimal subsection for re-encoding of content 230 seeks to minimize audio and visual impacts upon replacement of the original content with the re-encoded content.

Whether the minimum subsection of content 230 described above or an optimal subsection of content 230 that includes the minimum subsection is re-encoded, the surgical micro-encoding of a content subsection disclosed in the present application results in the following features: 1) re-encoding of a content subsection having N content segments results in a re-encoded subsection having N or greater than N content segments, 2) only the first content segment start of the re-encoded content subsection is guaranteed to be aligned to the start time of the original content subsection, 3) a new segment boundary will be produced that is aligned to the location of a marker, and 4) the last frame in display order) of the last content segment of the re-encoded content subsection will be the same as the last frame of the last content segment of the original content subsection.

Figure 3:
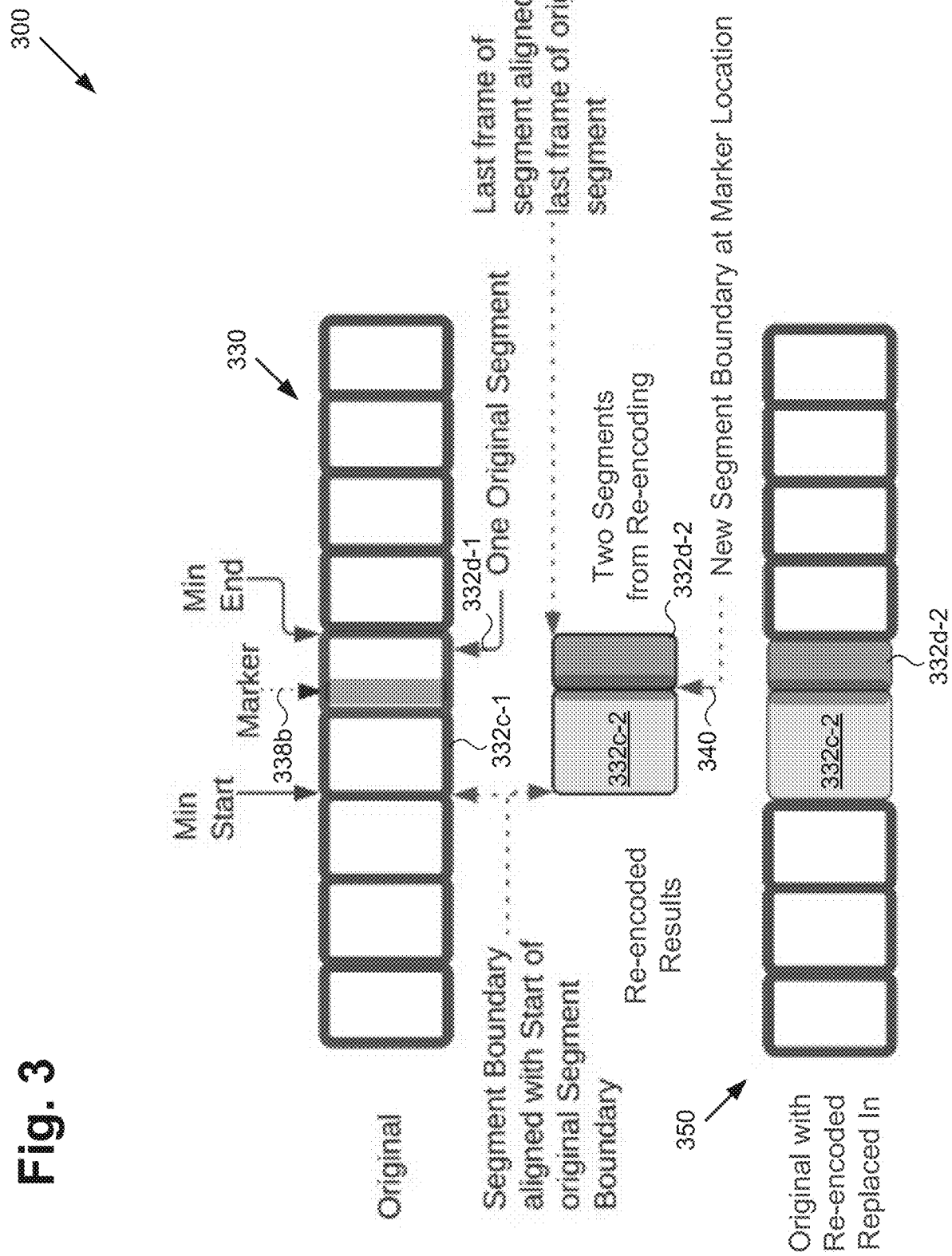
FIG. 3 shows a more detailed example of surgically micro-encoding content, according to one implementation.

FIG. 3 shows diagram 300 of a more detailed example of surgically micro-encoding content, according to one implementation. It is noted that the example shown in FIG. 3 corresponds to Case 1, in FIGS. 2A and 2B. As shown in FIG. 3, only content segment 332*d*-1 of content 330-1 containing the location of marker 338*b*, and its preceding content segment 332*c*-1 are surgically re-encoded to produce re-encoded content 350 having new segment boundary 340 at the location of marker 338*b*.

Marker 338*b*, content 330, content segment 332*c*-1, content segment 332*d*-1, and re-encoded content 350 correspond respectively in general to marker 238*b*, content 130/230, content segment 232*c*, content segment 232*d*, and re-encoded content 150, shown variously in FIGS. 1, 2A, and 2B. Consequently, marker 238*b*, content 130/230, content segment 232*c*, content segment 232*d*, and re-encoded content 150 may share any of the characteristics attributed to respective marker 338*b*, content 330, content segment 332*c*-1, content segment 332*d*-1, and re-encoded content 350 by the present disclosure, and vice versa.

The rationale for re-encoding a subsection of content 330 including content segments 332*c*-1 and 332*d*-1 is described above by reference to FIG. 2B and Case 1, and will not be repeated. However, it is noted that according to the example shown in FIG. 3, the re-encoding of content segments 332*c*-1 and 332*d*-1 to results in re-encoded content segment 332*c*-2 that includes all of original content segment 332*c*-1 and a portion of original content segment 332*d*-1, while re-encoded content segment 332*d*-2 includes less than all of original content segment 332*d*-1.

It is noted that some media formats, such as Dolby Vision® for example, contain per-frame content metadata, which is associated with, or integrated with, the underlying video frames. Such metadata may further be the result of a linear process that started at the beginning of content 130/230/330 and continues through to its end. In those use cases, the present surgical micro-encoding solution may include extraction of such metadata from the existing content segments and appropriate placement of that metadata into the re-encoded content segments. Referring to the exemplary use case shown in FIG. 3, content metadata associated with or included in content segment 332*d*-1 may be partitioned between re-encoded content segments 332*c*-2 and 332*d*-2 that border new segment boundary 340 based on the location of new segment boundary 340.

Figure 4A:
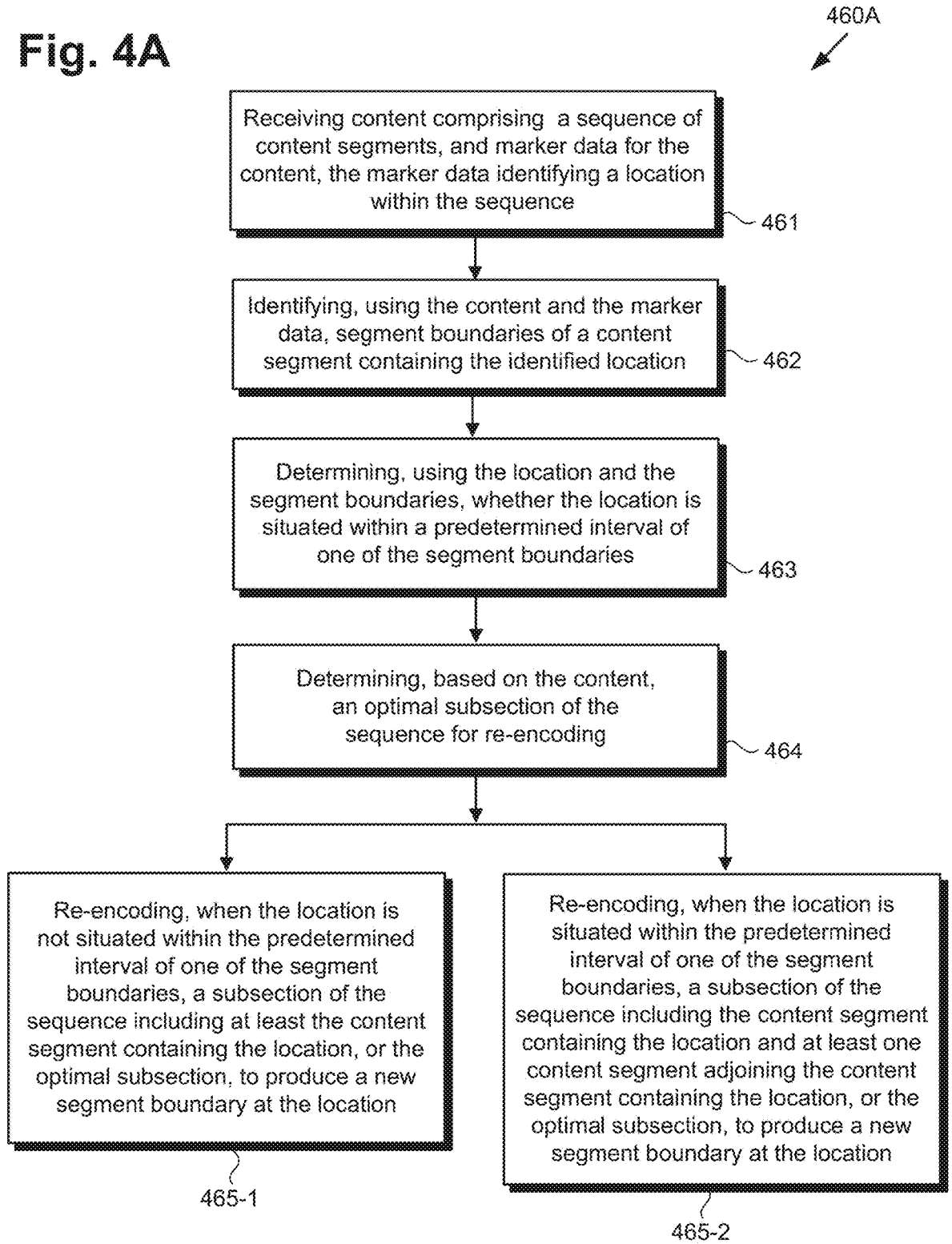
FIG. 4A shows a flowchart outlining an exemplary method for surgically micro-encoding content, according to one implementation.

The functionality of system 100 will be further described by reference to FIG. 4A. FIG. 4A shows flowchart 460A presenting an exemplary method for surgically micro-encoding content, according to one implementation. With respect to the method outlined in FIG. 4A, it is noted that certain details and features have been left out of flowchart 460A in, order not to obscure the discussion of the inventive features in the present application.

Referring now to FIG. 4A in combination with FIGS. 1 and 2A, flowchart 460A begins with receiving content 130/230 comprising a sequence of content segments 232, and marker data 126 for the content, marker data 126 identifying a location within the sequence (action 461). It is noted that the location within the sequence of content segments 232 included in content 130/230 that is identified by marker data 126 may be an insertion point for interstitial content into the sequence of content segments 232. Content 130/230 and marker data 126 may be received in action 461 by micro-encoding software code 110, executed by processing hardware 104 of system 100. For example, as shown in FIG. 1, in some implementations, content 130/230 and marker data 126 may be received by system 100 from content source 116, either via communication network 112 and network communication links 114 or directly via communication link 118.

As noted above, content 130/230 may include any of a variety of different types and genres of AV content, as well as to video unaccompanied by audio, or audio unaccompanied by video. Specific examples of AV content include ABR content in the forth of movies, TV episodes or series, video games, and sporting events. In addition, or alternatively, in some implementations, content 130/230 may be or include digital representations of persons, fictional characters, locations, objects, and identifiers such as brands and logos, for example, which populate a VR, AR, or MR environment. Moreover, content 130/230 may depict virtual worlds that can be experienced by any number of users synchronously and persistently, while providing continuity of data such as personal identity, user history, entitlements, possessions, payments, and the like. Alternatively, or in addition, content 130/230 may be or include a hybrid of traditional AV and fully immersive VR/AR/MR experiences, such as interactive video.

Flowchart 460A further includes identifying, using content 130/230 and marker data 126, segment boundaries of a content segment containing the location identified by marker data 126 (action 462). Identification of the segment boundaries of the content segment containing the location identified by marker data 126 may be performed in action 462 by micro-encoding software code 110, executed by processing hardware 104 of computing platform 102, using any suitable technique known in the art.

Flowchart 460A further includes determining, using the location identified by marker data 126 and the segment boundaries identified in action 462, whether the location identified by marker data 126 is situated within a predetermined interval of one of those segment boundaries (action 463). By way of example, and as shown in FIGS. 2A and 2B, in some implementations, such a predetermined interval may be minimum content segment duration 233 in FIG. 2A, and action 463 may correspond to determining whether the location identified by marker data 126 corresponds to Case 1, Case 2, Case 3, or Case 4 illustrated in FIGS. 2A, 2B, and 2C with respect to content segment 232*d* in FIGS. 2B and 2C. Action 463 may be performed by micro-encoding software code 110, executed by processing hardware 104 of computing platform 102.

As discussed above by re FIGS. 2B and 2C, a minimum subsection for re-encoding content 230 to produce a new segment boundary may be identified based on the determination performed in action 463. However and as further discussed above, in some implementations, it may be advantageous or desirable to re-encode an optimal subsection of content 230, where that, optimal subsection is longer than the minimum subsection d includes the minimum subsection.

Thus, in some implementations, flowchart 460A may further include determining, based on content 130/230, an optimal subsection of the sequence for re-encoding, the optimal subsection including multiple content segments in addition to content segment 232d containing the location (action 464). It is noted that action 464 is optional, and in some implementations may be omitted from the method outlined by flowchart 460A. However, in implementations in which action 464 is included in the method outlined by flowchart 460A, action 464 may be performed by micro-encoding software code 110, executed by processing hardware 104 of computing platform 102, as described above by reference to FIG. 2B. It is noted that, as further described above by reference to FIG. 2B, in various use case, one or more of the multiple content segments in addition content segment 232d that are included in the optimal subsection may precede content segment 232d, may succeed 232d, or one or more of those content segments may precede and one or lore of those content segments may succeed content segment 232d.

Referring to FIG. 3 in combination with FIGS. 1, 2A, 29, 2C, and 4A, Flowchart 460A further includes re-encoding a subsection of the sequence to produce new segment boundary 340 at the location identified by marker data 126. When that location is determined to not be situated within the predetermined interval of one of the segment boundaries of content segment 232d in action 463, the subsection to be re-encoded includes at least content segment 232d containing the location identified by marker data 126 and may include not more than content section 232d (action 465-1). However, when the location identified by marker data 126 is determined to be situated within the predetermined interval of one of the segment boundaries of content segment 232d, the subsection to be re-encoded includes at least the content segment containing that location and a content segment adjoining content segment 232d containing that location, i.e., either content segment 232c preceding content segment 232d or content segment 232e succeeding content segment 232d, and may include not more than content segment 232d and one of content segments 232c or 232e (action 465-2). As noted above, in some implementations, actions 464 and 465 may be omitted from flowchart 460A. In those implementations, action 463 may be followed directly by action 466.

Whether re-encoding of a subsection of content 230 that includes content segment 232d is performed according to action 465-1 or action 465-2, that re-encoding may be performed by micro-encoding software code 110 executed by processing hardware 104 of computing platform 102. It is noted that in some use cases, content 130/230 may have previously been transcoded, segmented, potentially encrypted, ABR media play lists produced, and the resultant content 130/230 is only stored on an origin. That is to say, the original transcoded version of content 130/230 may not exist or may be unavailable. In those use cases, action 465-1 or action 465-2 may include obtaining the origin and re-encoding a subsection of the origin. However, in use cases in which the original transcoded version of content 130/230 is available, action 465-1 or action 465-2 may include first decoding the subsection of content 230 to be re-encoded, and then re-encoding that subsection.

Figure 4B:
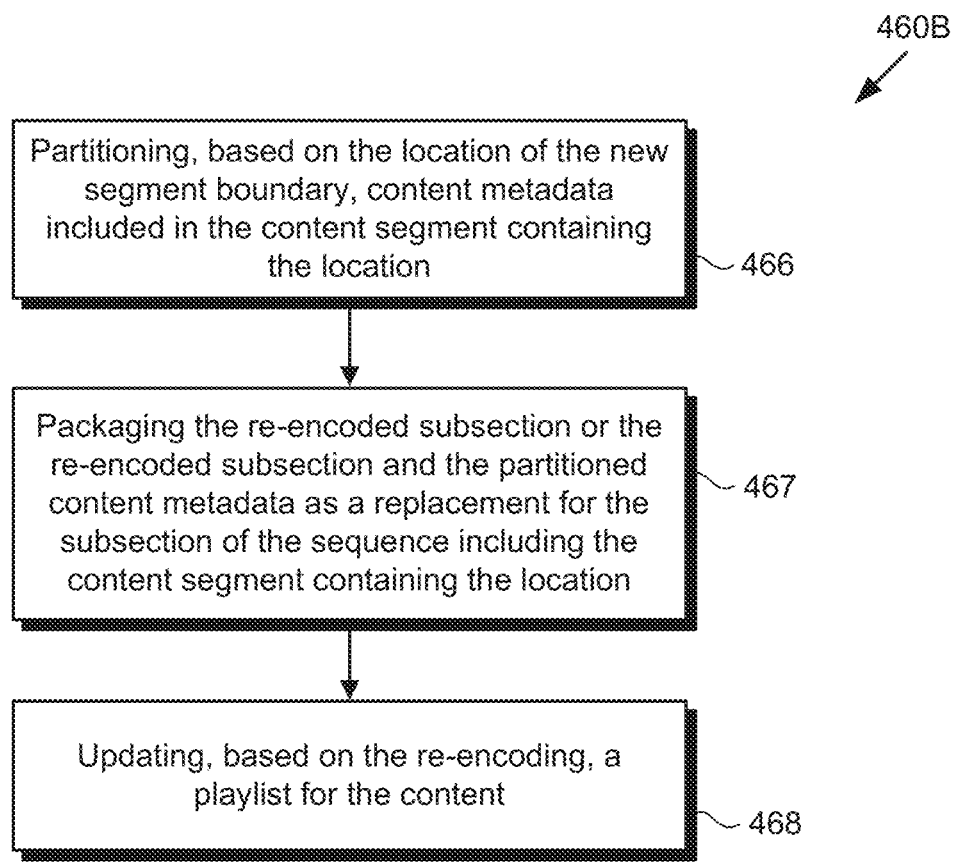
FIG. 4B shows a flowchart describing exemplary actions for extending the method outlined in FIG. 4A, according to one implementation.

Although in some implementations, the method outlined by flowchart 460A may conclude with action 465-1 or action 465-2, in other implementations, that method may be extended to include additional actions. Referring now to FIG. 4B, FIG. 4B shows flowchart 460B describing exemplary actions for extending the method outlined in FIG. 4A, according to one implementation. With respect to the actions described in FIG. 4B, it is noted that certain details and features have been left out of flowchart 460B in order not to obscure the discussion of the inventive features in the present application.

In some use cases, as described above by reference to FIG. 3 with further reference to FIG. 1, content segment 332d-1 that includes the location identified by marker data 126 may further correspond to content metadata associated with or included in content segment 332d-1. In those use cases, the method outlined by flowcharts 460A and 460B may further include partitioning that content metadata between re-encoded content segments 332c-2 and 332d-2 that border new segment boundary 340 based on the location of new segment boundary 340 (action 466). It is noted that action 466 is optional, and in some implementations may be omitted from the method extended by flowchart 460B. However, in implementations in which action 466 is included in the method extended by flowchart 460B, action 466 may be performed by micro-encoding software code 110, executed by processing hardware 104 of computing platform 102, as described above by reference to FIG. 3.

Flowchart 460B may further include packaging the subsection of the sequence re-encoded in action 465-1 or 465-2, or the subsection of the sequence re-encoded in action 465-1 or 465-2 and the content metadata partitioned in action 466, as a replacement for the subsection of the sequence that includes content segment 232d containing the location identified by marker data 126 (action 467). By way of example, the subsection of the sequence re-encoded in action 465-1 or 465-2, or the subsection of the sequence re-encoded in action 465-1 or 465-2 and the content metadata partitioned in action 466 may be packaged, or packaged and encrypted, into any desired packaging format, such as Common Media Application Format (CMAF), for example. However, it is noted that action 467 is optional, and in some implementations may be omitted from the method extended by flowchart 460B. In implementations in which action 467 is included in the method extended by flowchart 460B, action 467 may be performed by micro-encoding software code 110, executed by processing hardware 104 of computing platform 102.

Flowchart 460B may further include updating a playlist for content 130/230 based on the re-encoding performed in action 465-1 or 465-2 (action 468). Many ABR protocol specifications use a form of playlist that uses Uniform Resource Identifiers (URIs), such as Uniform Resource Locators (URLs) for example, for discrete segmented files. In those use cases, an existing playlist for content 130/230 may be based on action 465-1 or 465-2. Alternatively, the subsection re-encoded in action 465-1 or 465-2 may need to be delineated per a given ABR protocol specification. For example, in HLS, if the encoding parameters or encoding sequence is different than the original, a #EXT-X-DISCONTINUITY tag is used. It is noted that action 468 is optional, and in some implementations may be omitted from the method extended by flowchart 460B. However, in implementations in which action 468 is included in the method extended by flowchart 460B, action 468 may be performed by micro-encoding software code 110, executed by processing hardware 104 of computing platform 102.

With respect to the actions described by flowcharts 460A and 460B, it is noted that actions 461, 462, and 463 (hereinafter "actions 461-463"), actions 461-463 and 465-1, actions 461-463 and 465-2, actions 461-463, 464, and 465-1, actions 461-463, 464, and 465-2, or any of those aforementioned sequences of actions in combination with one or more of actions 466, 467, and 468 may be performed as automated processes from which human involvement may be omitted.

Thus, the present application discloses systems and methods for surgically micro-encoding content. The surgical micro-encoding solution disclosed in the present application enables creation of new segment boundaries where ones did not previously exist by advantageously considering new content segment boundary locations, existing content segment boundaries, restrictions on minimum and maximum content segment durations, the potential for subjective audio or video irregularities produced by re-encoding, and preservation of original metadata, as well as modification needs to alternate content playlists. Moreover, the present solution advances the state-of-the-art as described above while significantly reducing the time required to re-encode, as well as the QC time required in validation, because only surgically targeted micro-areas are re-encoded.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a computing platform having a processing hardware and a system memory storing a software code;
   the processing hardware configured to execute the software code to:
   receive content comprising a sequence of content segments, and marker data for the content, the marker data identifying a location within the sequence;
   identify, using the content and the marker data, segment boundaries of a content segment containing the identified location;
   determine, using the location and the segment boundaries, whether the location is situated within a predetermined interval of one of the segment boundaries;
   identify, based on at least one of (i) shot metadata, (ii) scene change detection, or (iii) chunk boundary complexity analysis, a subsection of the sequence for re-encoding, the subsection including at least the content segment containing the identified location; and
   re-encode, based on determining, the subsection of the sequence to produce a new segment boundary at the location;
   wherein when the location is determined to be situated within the predetermined interval of one of the segment boundaries, the subsection of the sequence further includes at least one content segment adjoining the content segment containing the location.

2. The system of claim 1, wherein the processing hardware is further configured to execute the software code to:
   package the re-encoded subsection of the sequence as a replacement for the subsection of the sequence including the content segment containing the location.

3. The system of claim 1, wherein the subsection of the sequence includes a plurality of content segments in addition to the content segment containing the location.

4. The system of claim 3, wherein at least one of the plurality of content segments precedes the content segment containing the location or succeeds the content segment containing the location.

5. The system of claim 1, wherein the content segment containing the location includes content metadata, and wherein the processing hardware is further configured to execute the software code to:
   partition, based on the location of the new segment boundary, the content metadata between content segments that border the new segment boundary.

6. The system of claim 5, wherein the processing hardware is further configured to execute the software code to:
   package the re-encoded subsection of the sequence and the partitioned content metadata as a replacement for the subsection of the sequence including the content segment containing the location.

7. The system of claim 1, wherein the processing hardware is further configured to execute the software code to:
   update, based on the re-encoding, a playlist for the content.

8. The system of claim 1, wherein the content comprises adaptive bit-rate (ABR) content.

9. The system of claim 1, wherein the location within the sequence identified by the marker data comprises an insertion point for interstitial content into the sequence of content segments.

10. The system of claim 1, wherein the subsection of the sequence including the content segment containing the location comprises at least one fewer content segment than the re-encoded subsection of the sequence.

11. A method for use by a system including a computing platform having a processing hardware, and a system memory storing a software code, the method comprising:
    receiving, by the software code executed by the processing hardware, content comprising a sequence of content segments, and marker data for the content, the marker data identifying a location within the sequence;
    identifying, by the software code executed by the processing hardware and using the content and the marker data, segment boundaries of a content segment containing the identified location;
    determining, by the software code executed by the processing hardware and using the location and the segment boundaries, whether the location is situated within a predetermined interval of one of the segment boundaries;
    identifying, by the software code executed by the processing hardware based on at least one of (i) shot metadata, (ii) scene change detection, or (iii) chunk boundary complexity analysis, a subsection of the sequence for re-encoding, the subsection including at least the content segment containing the identified location; and re-encoding, by the software code executed by the processing hardware based on determining, the subsection of the sequence to produce a new segment boundary at the location;
    wherein when the location is determined to be situated within the predetermined interval of one of the segment boundaries, the subsection of the sequence further includes at least one content segment adjoining the content segment containing the location.

12. The method of claim 11, further comprising:
packaging, by the software code executed by the processing hardware, the re-encoded subsection of the sequence as a replacement for the subsection of the sequence including the content segment containing the location.

13. The method of claim 11, wherein the subsection of the sequence includes a plurality of content segments in addition to the content segment containing the location.

14. The method of claim 13, wherein at least one of the plurality of content segments precedes the content segment containing the location or succeeds the content segment containing the location.

15. The method of claim 11, wherein the content segment containing the location includes content metadata, the method further comprising:
partitioning, by the software code executed by the processing hardware based on the location of the new segment boundary, the content metadata between content segments that border the new segment boundary.

16. The method of claim 15, further comprising:
packaging the re-encoded subsection of the sequence and the partitioned content metadata, by the software code executed by the processing hardware, as a replacement for the subsection of the sequence including the content segment containing the location.

17. The method of claim 11, further comprising:
updating, by the software code executed by the processing hardware based on the re-encoding, a playlist for the content.

18. The method of claim 11, wherein the content comprises adaptive bit-rate (ABR) content.

19. The method of claim 11, wherein the location within the sequence identified by the marker data comprises an insertion point for interstitial content into the sequence of content segments.

20. The method of claim 11, wherein the subsection of the sequence including the content segment containing the location comprises at least one fewer content segment than the re-encoded subsection of the sequence.

* * * * *